United States Patent
Bacou et al.

(10) Patent No.: US 9,546,006 B2
(45) Date of Patent: Jan. 17, 2017

(54) METHOD OF MOUNTING PRESSURE PORTS IN THE SKIN OF AN AIRCRAFT

(71) Applicant: Airbus Operations (SAS), Toulouse (FR)

(72) Inventors: Michel Bacou, Venerque (FR); Christophe Arruti, Aubiet (FR)

(73) Assignee: Airbus Operations SAS, Toulouse (FR)

( * ) Notice: Subject to any disclaimer, the term of this patent is extended or adjusted under 35 U.S.C. 154(b) by 212 days.

(21) Appl. No.: 14/492,307

(22) Filed: Sep. 22, 2014

(65) Prior Publication Data

US 2015/0082615 A1 Mar. 26, 2015

(30) Foreign Application Priority Data

Sep. 26, 2013 (FR) ...................... 13 59257

(51) Int. Cl.
| | | |
|---|---|---|
| *B23Q 17/00* | (2006.01) | |
| *B64F 5/00* | (2006.01) | |
| *B64D 43/02* | (2006.01) | |
| *G01P 5/14* | (2006.01) | |
| *G01P 13/02* | (2006.01) | |
| *B23C 3/12* | (2006.01) | |

(52) U.S. Cl.
CPC ............. *B64F 5/0009* (2013.01); *B23C 3/12* (2013.01); *B64D 43/02* (2013.01); *G01P 5/14* (2013.01); *G01P 13/025* (2013.01); *B23C 2215/04* (2013.01); *Y10T 29/49002* (2015.01); *Y10T 29/49764* (2015.01); *Y10T 29/49888* (2015.01); *Y10T 407/1928* (2015.01)

(58) Field of Classification Search
CPC ............. Y10T 156/10; Y10T 29/49764; Y10T 29/49888; B23C 2215/04; B64D 43/02; G01P 13/025

USPC ............ 29/407.01, 407.09, 407.1, 460, 523, 29/525.02, 592.1; 244/1 R, 53 B, 129.1
See application file for complete search history.

(56) References Cited

U.S. PATENT DOCUMENTS

| | | | | |
|---|---|---|---|---|
| 5,245,743 | A * | 9/1993 | Landy | ..................... B23P 9/025 29/523 |
| 7,407,136 | B2 * | 8/2008 | Murg | ....................... B64C 7/00 244/1 R |
| 2001/0030261 | A1 | 10/2001 | Bourgon et al. | |
| 2002/0182993 | A1 | 12/2002 | Ueno | |
| 2011/0081230 | A1 | 4/2011 | Dimelow | |

FOREIGN PATENT DOCUMENTS

| | | |
|---|---|---|
| EP | 1145952 | 10/2001 |
| EP | 2309100 | 4/2011 |

OTHER PUBLICATIONS

French Search Report, Mar. 21, 2014.

* cited by examiner

*Primary Examiner* — Thiem Phan
(74) *Attorney, Agent, or Firm* — Greer, Burns & Crain, Ltd.

(57) ABSTRACT

A method of mounting at least one pressure port in a skin of an aircraft, where the port is made with a hollow tube implanted in the skin, optimizes conditions whereby each of the tubes is made flush with the skin so that static or dynamic pressure measurements are accurate and reliable. The method includes a step of leveling each of the tubes and a step of painting the skin. To achieve satisfactory leveling conditions for the tubes on each occasion, the leveling step is independent of the layer of paint deposited on the skin.

12 Claims, 2 Drawing Sheets

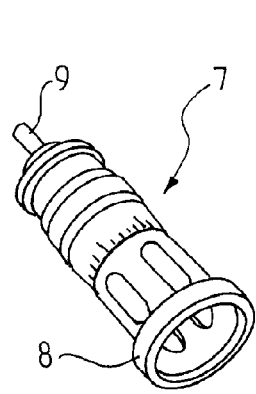
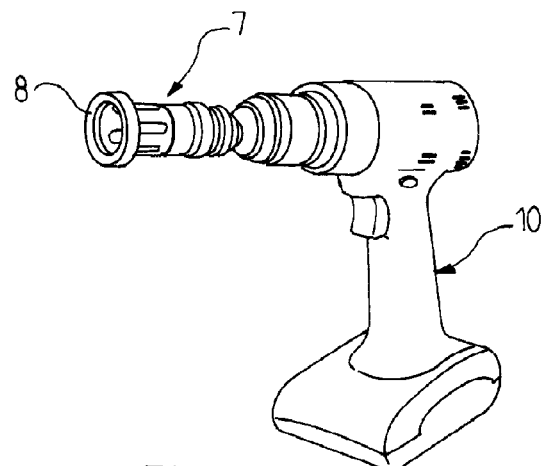
FIG.4    FIG.5
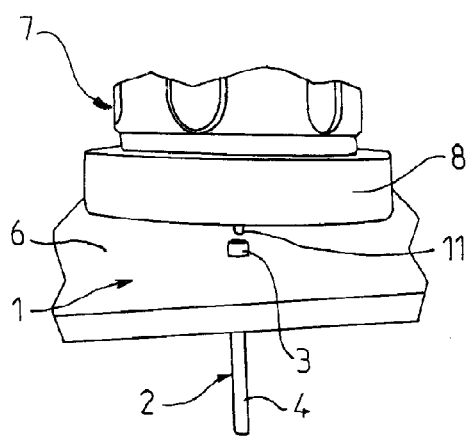
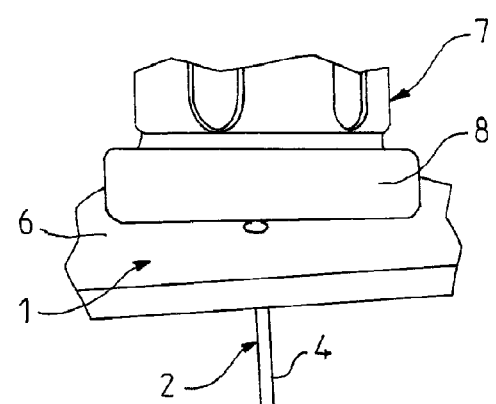
FIG.6A    FIG.6B
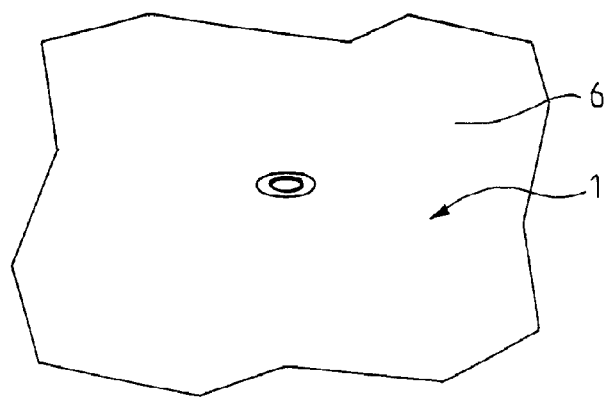
FIG.7

METHOD OF MOUNTING PRESSURE PORTS IN THE SKIN OF AN AIRCRAFT

CROSS-REFERENCES TO RELATED APPLICATIONS

This application claims the benefit of the French Patent Application No. 1359257 filed on Sep. 26, 2013, the entire disclosures of which are incorporated herein by way of reference.

BACKGROUND OF THE INVENTION

The invention relates to a method of mounting pressure ports in the skin of an aircraft. More specifically, such a method seeks to install pressure ports flush with the skin of an aircraft, so as to enable static or dynamic pressure to be measured.

Generally, in the field of aviation, a pressure port in the skin of an aircraft is provided with a stainless steel tube connected to a pressure sensor, the tube being implanted perpendicularly to a surface element of the skin. The pressure sensor is an absolute or differential pressure sensor and it is connected to an acquisition unit suitable for receiving the electric signal delivered by the sensor when it acquires a pressure measurement. The acquisition unit transmits the measured pressure value to a data recorder and/or to a display screen, thus making it possible to know instantaneously the value of the acquired pressure.

In order to obtain pressure measurements that are usable, it is essential for the hollow tube to be very closely flush with the surface element, with predefined accuracy of plus or minus a few tens of micrometers.

It should be noted that such mounting methods include an unavoidable step of applying paint to the skin of the aircraft.

The mounting method of the invention seeks to improve the conditions whereby each pressure port tube is level and flush with the skin of an aircraft.

SUMMARY OF THE INVENTION

The invention provides a method of mounting at least one pressure port in the skin of an aircraft, the port being made with a hollow tube implanted in the skin.

According to the invention, the method includes a step of implanting at least one elongate tube in the skin of the aircraft, the tube emerging from the skin, a step of painting the skin and the emerging portion of the at least one tube, a step of cutting the emerging portion in order to shorten its length, and a step of leveling the shortened emerging portion in order to cause the at least one tube to be flush with the paint-coated skin, to within a predetermined tolerance range.

With these steps, the leveling of each tube no longer depends on the thickness of the deposited layer of paint, and leveling can thus be performed with the desired degree of accuracy to obtain usable measurements of static or dynamic pressure. A method of mounting pressure ports in an implementation of the invention thus guarantees that each pressure port tube is generally flush with the skin of the aircraft in which it is implanted, with this being achieved in a manner that is systematic, reliable, and reproducible.

It is assumed that the skin is embodied by a wall of small thickness defining an outside surface and an inside surface, with the tube being made to be flush with the outside surface.

According to a possible embodiment, a mounting method of the invention includes a step of testing each implanted tube in order to verify that the tube is neither plugged nor leaky.

According to a possible embodiment, the test step takes place prior to the painting step and is performed by measuring pressure at each tube.

According to a possible embodiment, a mounting method of the invention further includes a step of protecting the tube prior to the painting step in order to prevent paint from penetrating into the tube.

According to a possible embodiment, the protecting step corresponds to a step of temporarily closing the tube.

According to a possible embodiment, the tube is made to be flush with the skin within tolerance lying in the range ±40 micrometers (µm).

According to a possible embodiment, the leveling step is performed with a milling tool with micrometer adjustment, the milling tool being mounted on a power tool having a rotary platform.

According to a possible embodiment, the power tool is a screwdriver.

According to a possible embodiment, a mounting method of the invention includes a verification step serving to verify the quality with which the tube is flush.

According to a possible embodiment, a mounting method of the invention includes a step of pneumatically connecting each tube to a pressure sensor.

According to a possible embodiment, a mounting method of the invention includes a step of connecting each pressure sensor to a data acquisition unit.

According to a possible embodiment, a mounting method of the invention includes a step of connecting the data acquisition unit to at least one element selected from the group formed by a data recorder and a display screen.

In another aspect, the invention provides a leveling device for performing the leveling step of a method in accordance with the invention. According to the invention, the leveling device includes a milling device with micrometer adjustment, which milling device is mounted on a power tool provided with a rotary platform.

According to a possible embodiment, the power tool is a screwdriver.

According to a possible embodiment, the milling device includes a first end suitable for receiving an adapter in which a cutter-carrier is fastened that includes an appropriate milling cutter.

According to a possible embodiment, the milling device has a second end possessing a drive shaft.

BRIEF DESCRIPTION OF THE DRAWINGS

A detailed description of a preferred embodiment of a mounting method of the invention is given with reference to FIGS. 1 to 7 below.

FIG. 4 is a perspective view of a milling device for performing the leveling step in accordance with a mounting method of the invention.

FIG. 5 is a perspective view of a screwdriver having the milling device of FIG. 4 mounted thereon, the screwdriver being used for performing the leveling step in accordance with a mounting method of the invention.

FIG. 6A is a side view showing the interaction between the milling device and a pressure port tube implanted in the skin at a first stage of a leveling step in accordance with a mounting method of the invention.

FIG. 6B is a side view showing the interaction between the milling device and the pressure port tube implanted in the skin at a later stage during the leveling step in accordance with a mounting method of the invention.

FIG. 7 is a side view of a pressure port tube implanted in the skin, the tube being flush with the surface of the skin as a result of a mounting method of the invention.

DETAILED DESCRIPTION OF THE PREFERRED EMBODIMENTS

In outline, a method of measuring the pressure on a skin of an aircraft includes obtaining a local value for the static or dynamic pressure at the skin 1 with a pressure sensor connected to a stainless steel tube 2 that is placed to be flush with the skin 1. The skin 1 of an aircraft is generally constituted by an assembly of panels, and each pressure port tube 2 is implanted in one of the panels. When the sensor measures a pressure, it sends a corresponding electric signal to an acquisition unit that transmits the value of the measured pressure to a data recorder and/or to a display screen. If the skin 1 is planar where pressure is sensed, the tube 2 is arranged perpendicularly to the skin 1. If the skin 1 has curvature where pressure is sensed, then the tube 2 is positioned radially relative to the skin 1. A mounting method in accordance with the invention seeks mainly to ensure that the tube 2 is placed flush within a predetermined tolerance range in a manner that is systematic, reliable, and reproducible. The aircraft is preferably constituted by an airplane, possibly being a prototype for representing an airplane under flying conditions.

A preferred method of mounting at least one pressure port in the skin 1 of an aircraft by using at least one hollow tube 2 implanted in the skin 1 includes the following steps:

a step of implanting at least one elongate tube 2 in the skin 1 of the aircraft, the at least one tube 2 emerging from the skin 1;

a step of closing the at least one tube 2;

a step of painting the skin 1 and the emerging portion 3 of the at least one tube 2;

a step of cutting the emerging portion 3 to shorten its length; and a step of leveling the shortened emerging portion 3 to cause the at least one tube 2 to be flush with the skin 1 to within a predetermined tolerance range.

It should be specified that this method is repeated as many times as there are pressure ports to be mounted. Only the painting step is general and is performed as a single operation for all of the pressure ports to be mounted.

Each of the above-mentioned steps is described in greater detail with reference to the corresponding figures.

Figure 1:
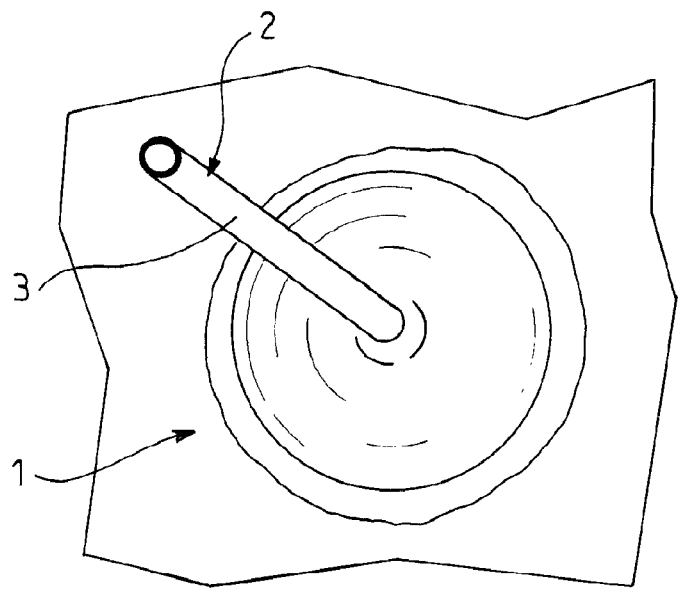
FIG. 1 is a perspective view of a pressure port tube implanted in the skin, showing the implanting step in accordance with the mounting method of the invention.

With reference to FIG. 1, a preferred mounting method begins with a step of implanting at least one hollow tube 2, e.g. made of stainless steel, in the skin 1 of an aircraft. It is assumed that the skin 1 is embodied by a plane wall of small thickness, presenting an inside surface and an outside surface 6. Each of the tubes 2 is elongate and is fastened in the skin 1 so that it passes through the skin 1 across its thickness. In this way, and with reference to FIG. 2, each tube 2 as fastened in the skin 1 has a segment 3 that emerges to the outside of the skin 1, and another segment 4 that remains inside the skin 1. The inside segment 4 is connected to a pressure sensor (not shown). To ensure that each implanted tube 2 is neither plugged nor leaky, a step is performed of testing each of the tubes 2 with a pressure measurement. If this step reveals the presence of a defective tube 2, it can be removed and replaced with a new tube 2.

Figure 2:
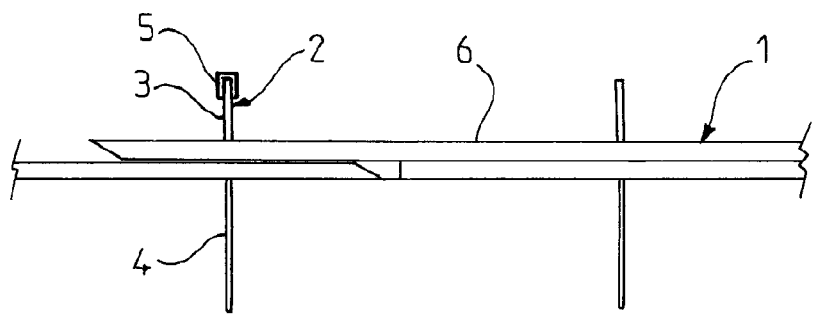
FIG. 2 is a side view of the FIG. 1 tube closed by a closure member, showing the protection step in accordance with a mounting method of the invention.

With reference to FIG. 2, once each stainless steel tube 2 has been fastened to the skin 1, the preferred mounting method includes a step of closing the segment 3 of each of the tubes 2 emerging to the outside of the skin 1. It is important to close such a segment 3 before the step of applying paint to avoid any paint penetrating into the tube 2, since penetration of paint into the tube would run the risk of incorrect pressure measurements or even prevent any measurements. This closure step also serves to show which tubes have been tested. By way of example, each tube 2 is closed with a temporary closure plug 5 that is inserted in the free end of the segment 3 emerging from the outside surface 6 of the skin 1. Once the painting step has been completed, the closure plug 5 is removed immediately.

The skin painting step of the invention takes place after the step of closing each tube 2. Thus, a layer of paint is deposited uniformly over the entire outside surface 6 of the skin 1, and thus on all of the segments 3 of the tubes 2 emerging from the outside surface 6.

Figure 3:
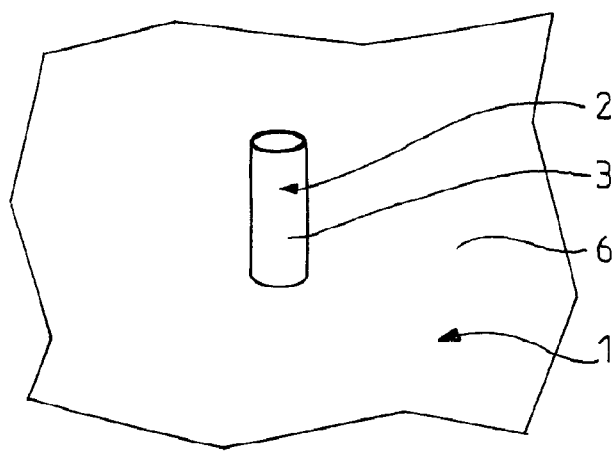
FIG. 3 is a perspective view of a pressure port tube implanted in the skin, showing the cutting step in accordance with a mounting method of the invention.

With reference to FIG. 3, the painting step is followed by a step of cutting the emerging segment 3 of each tube 2, so as to shorten its length to a few millimeters. This cutting step begins after the closure plug 5 has been removed from the emerging segment 3.

Each shortened segment 3 is then subjected to a leveling step so that each tube 2 is flush with the outside surface 6 of the skin 1 with accuracy of plus or minus 40 µm. The accuracy with which pressure is measured using each tube 2 depends on the quality with which it is flush with the outside surface 6 of the skin 1. Ideally, it should be flush without any difference in level relative to the outside surface 6.

With reference to FIG. 4, this leveling step is performed using a milling device 7 of elongate shape and with micrometer adjustment, the milling device having a first end that is threaded to receive a smooth protective adapter 8 made of a plastic material. The adapter 8 is of annular shape, and it possesses cylindrical inner and outer surfaces that are coaxial. The inner surface of the adapter 8 is threaded to enable the adapter 8 to be mounted by screw fastening on the threaded end of the milling device 7. A milling cutter suitable for the desired leveling is fastened to a cutter-carrier, which is itself screwed in the milling device 7. The height of the cutter is adjusted in the device 7 with a ruler so as to occupy an optimum milling position. At a second end, the milling device 7 possesses a shaft 9 for driving it in rotation.

With reference to FIG. 5, the milling device 7 is mounted on a power tool having a rotary platform, such as a screwdriver 10. The milling device 7 is secured to the screwdriver 10 by its drive shaft 9 in such a manner that the cutter occupies a distal position on the screwdriver 10 relative to a grip handle. The cutter is a part that is substantially cylindrical and elongate, and actuating the screwdriver 10 causes the cutter to rotate about its axis of revolution.

With reference to FIG. 6A, the leveling step begins by pressing the adapter 8 of the milling device 7 against the outside surface 6 of the skin 1, and then continues by putting the cutter 11 mounted on the screwdriver 10 into contact against a painted segment 3 of shortened length of a stainless steel tube 2 that is fastened in the skin 1. Pressing the adapter 8 against the outside surface 6 serves to ensure that the stainless steel tube 2 is leveled accurately. The cutter 11 is positioned and centered by engaging a peg against the emerging segment 3 so that its axis of rotation is parallel to the axis of revolution of the segment 3.

With reference to FIG. 6B, the leveling step is followed by setting the cutter 11 into rotation against the emerging segment 3 of the tube 2 until the segment 3 is flush with the outside surface 6 of the skin 1 in which it is implanted, as shown in FIG. 7.

Thus, at the end of a mounting method of the invention, a tube 2 for sensing pressure through the skin 1 of an airplane is flush with the outside surface 6 of the skin 1 with tolerance of ±30 μm, the tolerance being well below the predetermined threshold tolerance of ±40 μm.

A mounting method in an implementation of the invention presents several advantages:

with the method, a pressure port can be mounted in a fuselage, in a wing, or more generally in any portion of an aircraft;

the method does not depend on the thickness of the deposited layer of paint, and it is thus possible to be unaffected by the layer of paint having non-uniform thickness over the entire skin 1;

the method can be performed quickly and easily, since once the milling device has been set for causing one tube 2 to be flush, it can be used repeatedly and without additional adjustment on the other tubes 2, obtaining leveling of the same quality; and when the paint is applied to the skin 1 of the aircraft, there is no need to begin by putting a pellet around each tube 2 to determine its position and the potential thickness of the paint. An operation of removing such a pellet after painting is also avoided, where such an operation is always difficult to perform.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of my contribution to the art.

The invention claimed is:

1. A method of mounting at least one pressure port in the skin of an aircraft, the port being made with a hollow tube implanted in the skin, the method comprising the following steps:

a step of implanting at least one elongate tube in the skin of the aircraft, the tube emerging from the skin;

a step of painting the skin and the emerging portion of the at least one tube;

a step of cutting the emerging portion in order to shorten its length; and a step of leveling the shortened emerging portion in order to cause the at least one tube to be flush with the paint-coated skin to within a predetermined tolerance range.

2. The mounting method according to claim 1, further comprising a step of testing each implanted tube in order to verify that the tube is neither plugged nor leaky.

3. The mounting method according to claim 2, wherein the testing step takes place prior to the painting step and is performed by measuring pressure at each tube.

4. The mounting method according to claim 1, further comprising a step of protecting the tube prior to the painting step in order to prevent paint from penetrating into the tube.

5. The mounting method according to claim 4, wherein the protecting step corresponds to a step of temporarily closing the tube.

6. The mounting method according to claim 1, wherein the tube is made to be flush with the skin within tolerance lying in the range ±40 μm.

7. The mounting method according to claim 1, wherein the leveling step is performed with a milling tool with micrometer adjustment, the milling tool being mounted on a power tool having a rotary platform.

8. The mounting method according to claim 7, wherein the power tool is a screwdriver.

9. The mounting method according to claim 1, further comprising a verification step serving to verify the quality with which the tube is flush.

10. The mounting method according to claim 1, further comprising a step of pneumatically connecting each tube to a pressure sensor.

11. The mounting method according to claim 10, further comprising a step of connecting each pressure sensor to a data acquisition unit.

12. The mounting method according to claim 11, further comprising a step of connecting the data acquisition unit to at least one element selected from the group formed by a data recorder and a display screen.

* * * * *